United States Patent
Ito et al.

(10) Patent No.: US 9,926,923 B2
(45) Date of Patent: Mar. 27, 2018

(54) FLUID CONTROL DEVICE

(71) Applicant: Alps Electric Co., Ltd., Tokyo (JP)

(72) Inventors: Junko Ito, Miyagi-ken (JP); Yasushi Watanabe, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 15/212,080

(22) Filed: Jul. 15, 2016

(65) Prior Publication Data
US 2016/0327031 A1 Nov. 10, 2016

Related U.S. Application Data

(63) Continuation of application No. PCT/JP2015/051539, filed on Jan. 21, 2015.

(30) Foreign Application Priority Data

Jan. 28, 2014 (JP) .................. 2014-013102

(51) Int. Cl.
  *F04B 43/02* (2006.01)
  *F16K 7/17* (2006.01)
  *F04B 45/04* (2006.01)
(52) U.S. Cl.
  CPC .............. *F04B 43/02* (2013.01); *F04B 45/04* (2013.01); *F16K 7/17* (2013.01)
(58) Field of Classification Search
  USPC ........ 137/863; 251/61, 61.1, 14, 331, 335.2, 251/358
  See application file for complete search history.

(56) References Cited

U.S. PATENT DOCUMENTS

| | | | | |
|---|---|---|---|---|
| 4,142,523 A | * | 3/1979 | Stegeman | A61M 5/165 137/501 |
| 4,181,245 A | | 1/1980 | Garrett et al. | |
| 4,304,260 A | | 12/1981 | Turner et al. | |
| 5,165,281 A | | 11/1992 | Bell | |
| 5,649,910 A | * | 7/1997 | Kriesel | A61M 5/152 128/DIG. 12 |
| 8,960,010 B1 | * | 2/2015 | Crnkovich | G01L 7/088 73/714 |

FOREIGN PATENT DOCUMENTS

| | | |
|---|---|---|
| JP | 59-186558 U | 12/1984 |
| JP | 64-51781 U | 3/1989 |
| JP | 2000-027813 | 1/2000 |
| JP | 2013-119799 | 6/2013 |

OTHER PUBLICATIONS

International Search Report dated Apr. 21, 2015 from PCT Application No. PCT/JP2015/051539.

* cited by examiner

Primary Examiner — Jessica Cahill
Assistant Examiner — Daphne M Barry
(74) Attorney, Agent, or Firm — Beyer Law Group LLP

(57) ABSTRACT

A film is sandwiched between a first plate and a second plate. Outer convex parts formed on the second plate are formed so that their protrusion height dimension is larger than that of an inner convex part. Each outer convex part is formed so that its width dimension is smaller than the inner convex part. When the first plate and second plate are face-joined together, the film is sandwiched between outer concave parts and the outer convex parts, after which the film is sandwiched between an inner concave part and an inner convex part and a tension is applied to a diaphragm part stretched in concave flow paths.

5 Claims, 5 Drawing Sheets

FLUID CONTROL DEVICE

CLAIM OF PRIORITY

This application is a Continuation of International Application No. PCT/JP2015/051539 filed on Jan. 21, 2015, which claims benefit of Japanese Patent Application No. 2014-013102 filed on Jan. 28, 2014. The entire contents of each application noted above are hereby incorporated by reference.

BACKGROUND OF THE INVENTION

1. Field of the Invention

The present invention relates to a fluid control device included in a so-called micro flow path device, and more particularly to a fluid control device in which a film is sandwiched between two plates and part of the film forms a diaphragm part.

2. Description of the Related Art

A micro flow path device is used in a reaction experiment or the like in which a small amount of fluid is used.

In a micro flow path device, a fine flow path is formed in, for example, a joined part of plates. A plurality of micro flow path devices of this type are combined for use in the application. A fluid control device that exerts functions of a pump, a valve, or the like may be used.

In Japanese Unexamined Patent Application Publication No. 2000-027813, an invention related to a micro valve is disclosed as a fluid control device. In this micro valve, a thin silicone rubber film is sandwiched between a silicon wafer and a thick silicone rubber film. A conduit tube, which works as a flow path, is formed in the thick silicone film. An opening part, which leads to the thin silicone film, is formed in the silicon wafer. When a positive pressure is applied from a pressure source through the opening part to the thin silicone film, the conduit tube is blocked with the thin silicone film, interrupting a fluid flow in the conduit tube.

SUMMARY OF THE INVENTION

In a micro flow path device, a fluid flow needs to be subtly controlled in a fine flow path. Therefore, if the micro valve described in Japanese Unexamined Patent Application Publication No. 2000-027813 or another device such as, for example, a pump is formed, it is necessary to stretch a film such as a thin silicon film between plates such as silicon wafers by applying a tension in such a way that the film is not warped or wrinkled. However, when a film is sandwiched between two plates, the film having a smaller area than the plates, it is very difficult to apply an appropriate tension in such a way that the film is not warped or wrinkled.

To solve the conventional problem described above, the present provides a fluid control device that, when a film that forms a diaphragm part is sandwiched between two plates, can always apply an appropriate tension to the film.

In a fluid control device that has a first plate, a second plate, and a film sandwiched between opposing surfaces of the first plate and second plate, part of the film being a diaphragm part disposed opposite to a flow path formed in the first plate and to a flow path formed in the second plate, the present invention is characterized in that:

the first plate has a first plane that abuts the film and a concave part that is positioned outside the diaphragm part and is recessed from the first plane, and a second plate has a second plane that abuts the film and a convex part that is disposed opposite to the concave part and protrudes from the second plane, part of the film being sandwiched at a fitting part between the concave part and the convex part; and at the fitting part between the concave part and the convex part, a film restricting part is structured at a position distant from the diaphragm part, and a film tension setting part is structured at a position closer to the diaphragm part than the film restricting part is, the film restricting part having a stronger force with which the film is held than the film tension setting part.

In the present invention, the first plate preferably has an outer concave part and an inner concave part, which is closer to the diaphragm part than the outer concave part is, the second plate preferably has an outer convex part disposed opposite to the outer concave part and an inner convex part disposed opposite to the inner concave part, and the protrusion dimension of the outer convex part from the second plane is preferably larger than the protrusion dimension of the inner convex part from the second plane.

The first film restricting part is preferably formed by a fitting part between the outer concave part and the outer convex part, and the film tension setting part is preferably formed by a fitting part between the inner concave part and the inner concave part.

In addition, with the fluid control device in the present invention, the concave part preferably has an inner wall surface oriented toward the diaphragm part and an outer wall surface oriented opposite to the inner wall surface, an interval between the outer wall surface and the inner surface of the concave part being narrower than an interval between the inner wall surface and the inner surface of the concave part.

The film restricting part is preferably formed by the outer wall surface and the inner surface of the concave part, and the film tension setting part is preferably formed by the inner wall surface and the inner surface of the concave part.

Alternatively, the inner convex part preferably has an inner wall surface oriented toward the diaphragm part and an outer wall surface oriented opposite to the inner wall surface, an interval between the outer wall surface and the inner surface of the inner concave part being narrower than an interval between the inner wall surface and the inner surface of the inner concave part.

The film restricting part is preferably formed by the outer wall surface and the inner surface of the inner concave part, and the film tension setting part is preferably formed by the inner wall surface and the inner surface of the inner concave part.

In the present invention, the film preferably is adhesive for the first surface and second surface.

The fluid control device in the present invention can stretch the diaphragm part of a film facing flow paths under an appropriate tension without warps or wrinkles just by sandwiching the film between two plates and joining them together.

DESCRIPTION OF THE PREFERRED EMBODIMENTS

A fluid control device 1, illustrated in FIGS. 1 to 4, in a first embodiment of the present invention, forms part of a micro flow path device. The fluid control device 1 is used to control the flow rate of a fluid.

Figure 2:
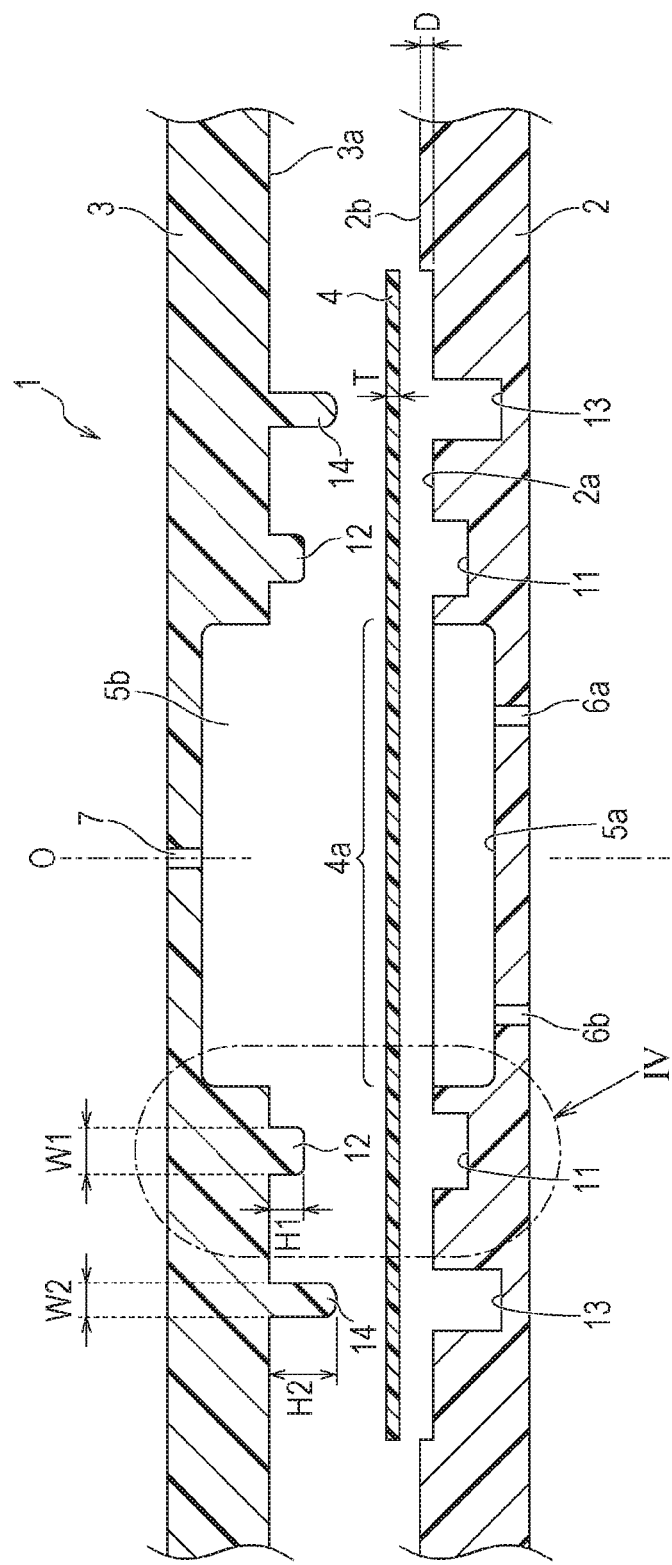
FIG. 2 is a cross-sectional view that illustrates a state in which the fluid control device illustrated in FIG. 1 is separated into an upper portion and a lower portion.
Figure 3:
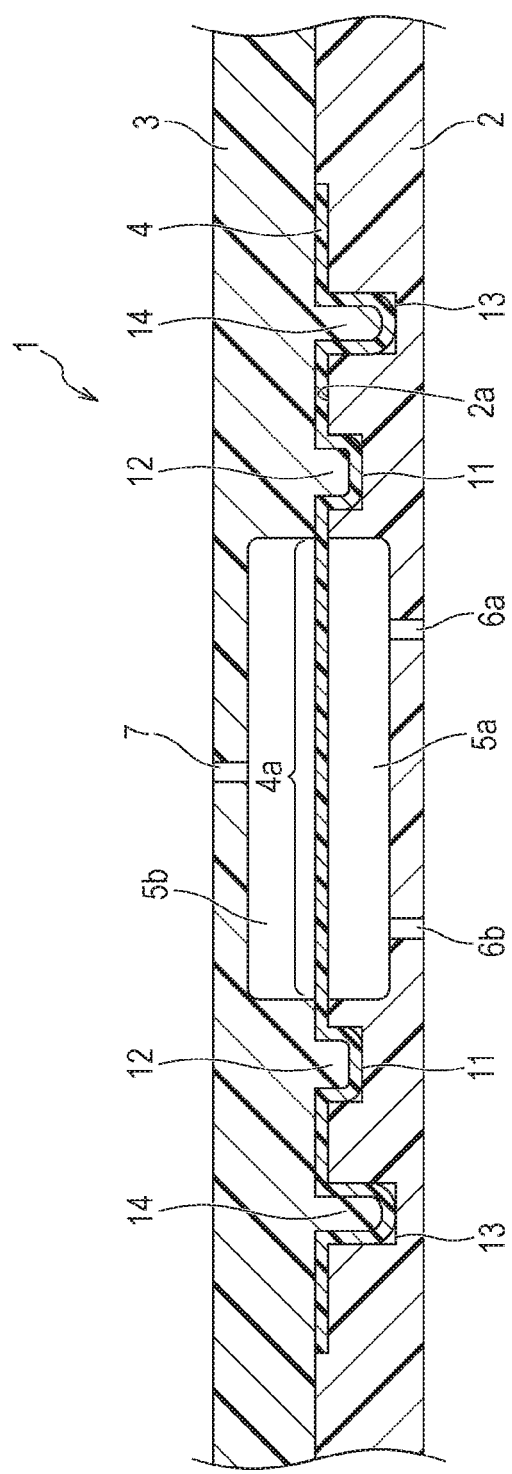
FIG. 3, which indicates a state in which the upper portion and lower portion of the fluid control device are joined together, is a cross-sectional view taken along line III-III in FIG. 1.

As illustrated in FIGS. 2 and 3, the fluid control device 1 has a first plate 2, a second plate 3, and a film 4, which is sandwiched between the first plate 2 and the second plate 3. The first plate 2 and second plate 3 are made of a cycloolefin polymer (COP) resin. The film 4 is preferably made of a resin material, such as a silicone resin, that has a flexibility and elasticity and the surface of which has a slight adhesion.

The fluid control device 1 is used in a reaction experiment in biological chemistry and other purposes. Therefore, the first plate 2, second plate 3, and film 4 are held with holding metal fittings or the like in a state in which the first plate 2 and second plate 3 are face-joined together as indicated in FIG. 3 without an adhesive being used, and are used.

The first plate 2 has a joining plane 2b and a first plane 2a, which is formed so as to be one step lower than the joining plane 2b, as illustrated in FIGS. 2 and 3. The first plane 2a is formed in the same area as the outline of the film 4 (circular shape), and the depth dimension D of the step between the first plane 2a and the joining plane 2b is the same as or slightly smaller than the thick dimension T of the film 4. The lower surface of the film 4 in a cross-sectional view is disposed on the first plane 2a.

The second plate 3 has a second plane 3a. When the first plate 2 and second plate 3 are face-joined together in a state in which the film 4 is sandwiched, the second plane 3a is face-joined to the joining plane 2b of the first plate 2 and abuts the upper surface of the film 4 in a cross-sectional view. The film 4 is sandwiched between the first plane 2a and the second plane 3a and is held.

Figure 1:
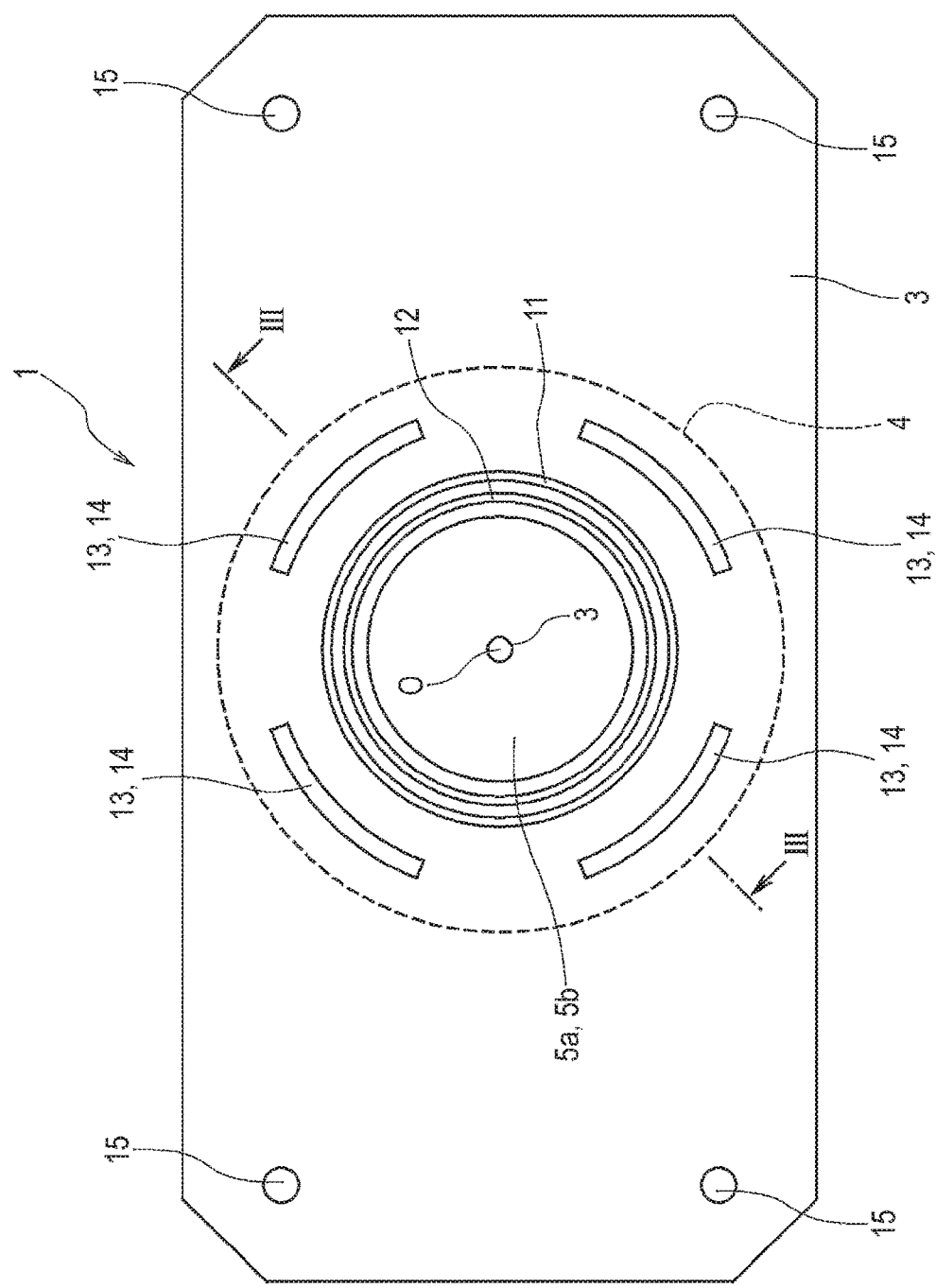
FIG. 1 is a plan view that illustrates a fluid control device in a first embodiment of the present invention.

A first concave flow path 5a is formed in the central portion of the first plate 2 so as to be recessed from the first plane 2a. Similarly, a second concave flow path 5b is formed in the central portion of the second plate 3 so as to be recessed from the second plane 3a. When the first plate 2 and second plate 3 are combined together, the first concave flow path 5a and second concave flow path 5b face to each other. The shapes of these concave flow paths 5a and 5b are circular in a plan view, as illustrated in FIG. 1.

As illustrated in FIG. 3, part of the film 4 sandwiched between the first plate 2 and the second plate 3 works as a diaphragm part 4a positioned on a boundary between the first concave flow path 5a and the second concave flow path 5b. The diaphragm part 4a is disposed opposite to (face) both the first concave flow path 5a and second concave flow path 5b.

A pair of communicating flow paths 6a and 6b, which communicate with the first concave flow path 5a, are formed in the first plate 2, and a communicating flow path 7, which communicates with the second concave flow path 5b, is formed in the second plate 3. A lower plate is face-joined to the lower surface of the first plate 2. A flow path communicating with the communicating flow path 6a and another flow path communicating with the communicating flow path 6b are formed between the first plate 2 and the lower plate. An upper plate is face-joined to the upper surface of the second plate 3, and a flow path communicating with the communicating flow path 7 is formed between the second plate 3 and the upper plate.

Outside the first concave flow path 5a and second concave flow path 5b, that is, on an outer circumferential side more outward than the diaphragm part 4a, an inner concave part 11 recessed from the first plane 2a is preferably formed in the first plate 2 and an inner convex part 12 protruding from the second plane 3a is preferably formed on the second plate 3, as illustrated in FIGS. 2 and 3. The inner concave part 11 and inner convex part 12 are shaped like a ring that is continuous so as to enclose the whole of the circumferences of the first concave flow path 5a and second concave flow path 5b, as illustrated in FIG. 1. When the first plate 2 and second plate 3 are face-joined together, the outer circumferential part, of the film 4, that encloses the diaphragm part 4a is sandwiched between the inner concave part 11 and the inner convex part 12.

On an outer circumferential side more outward than the inner concave part 11 and inner convex part 12, outer concave parts 13 recessed from the first plane 2a are preferably formed in the first plate 2 and outer convex parts 14 protruding from the second plane 3a are preferably formed on the second plate 3. The shapes of the outer concave part 13 and outer convex part 14 are a partial arc in a plan view, as illustrated in FIG. 1. The outer concave parts 13 and outer convex parts 14 are disposed at equal positional intervals around the center O of the first concave flow path 5a and second concave flow path 5b, that is, disposed at intervals of an equal angle around the center O. When the first plate 2 and second plate 3 are face-joined together, a part of the film 4, the part being on a further outer circumferential side, is sandwiched between the outer concave parts 13 and the outer convex parts 14.

As illustrated in FIG. 2, the protrusion dimension H2 of the outer convex part 14 from the second plane 3a is preferably larger than the protrusion dimension H1 of the inner convex part 12 from the second plane 3a. In addition, the width dimension W2 of the outer convex part 14 is smaller than the width dimension W1 of the inner convex part 12. The width dimensions W1 and W2 described here are measured from the center O in a radius direction. To match these dimensions, the outer concave part 13 is formed so as to be deeper than the inner concave part 11, and the outer concave part 13 is formed so that the dimension of the width of the opening is smaller than the dimension of the width of the opening in the inner concave part 11.

A first film restricting part is preferably formed by the structure of fitting between the outer concave parts 13 and the outer convex parts 14, and a first film tension setting part is preferably formed by the structure of fitting between the inner concave part 11 and the inner convex part 12.

Figure 4:
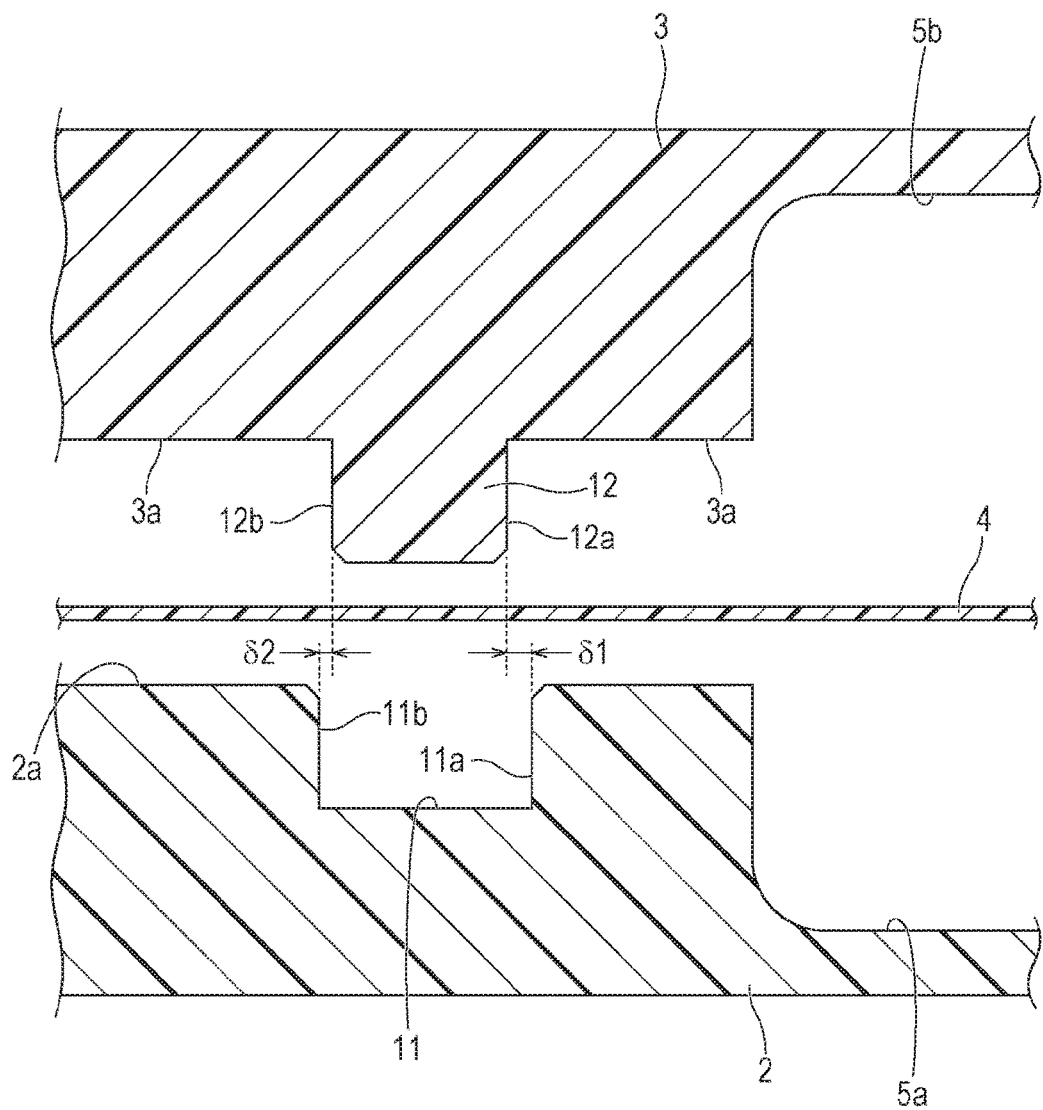
FIG. 4 is an enlarged cross-sectional view of a portion indicated by arrow IV in FIG. 2.

The inner concave part 11 and inner convex part 12 are enlarged in FIG. 4. The inner convex part 12 has an inner wall surface 12a oriented toward the first concave flow path 5a and second concave flow path 5b, and also has an outer wall surface 12b oriented toward the outer circumferential side opposite to the inner wall surface 12a. The first plate 2 and second plate 3 are joined together by being mutually positioned with respect to positioning holes 15 formed at a plurality of positions, as illustrated in FIG. 1. In FIG. 4, 51 indicates an interval between the inner wall surface 12a of the inner convex part 12 and the inner-side inner surface 11a of the inner concave part 11 with the first plate 2 and second plate 3 positioned, and 52 indicates an interval between the outer wall surface 12b of the inner convex part 12 and the outer-side inner surface 11b of the inner concave part 11.

The intervals 51 and 52 described here are interval dimensions from the center O in a radius direction.

At a fitting part between the inner concave part 11 and inner convex part 12, a second film restricting part is preferably formed by the outer wall surface 12b and outer-side inner surface 11b, and a second film tension setting part is preferably formed by the inner wall surface 12a and inner-side inner surface 11a.

The fluid control device 1 is assembled as described below.

As illustrated in FIG. 2, the circular film 4 is placed on the first plane 2a of the first plate 2 and the second plate 3 is joined from above the film 4. The first plate 2 and second plate 3 are mutually positioned by the positioning holes 15 and are further face-joined together while a mutually parallel state is maintained.

Since the protrusion height dimension H2 of the outer convex part 14 is larger than the protrusion height dimension H1 of the inner convex part 12 as illustrated in FIGS. 2 and 3, the film 4 is first sandwiched between the outer concave parts 13 and the outer convex parts 14 and is then sandwiched between the inner concave part 11 and the inner convex part 12. The protrusion height dimension H2 of the outer convex part 14 is larger than the protrusion height dimension H1 of the inner convex part 12 and the width dimension W2 of the outer convex part 14 is smaller than the width dimension W1 of the inner convex part 12. Therefore, a force with which the film 4 is held at a fitting part of the outer concave part 13 and outer convex part 14 is stronger than a force with which the film 4 is held at the fitting part of the inner concave part 11 and inner convex part 12.

During a time while the first plate 2 and second plate 3 are joined together, the film 4 is sandwiched between the outer concave parts 13 and the outer convex parts 14, which form the first film restricting part, after which the film 4 is sandwiched between the inner concave part 11 and the inner convex part 12, which form the first film tension setting part. Since the inner concave part 11 and inner convex part 12 are fitted to each other in a state in which the film 4 is sandwiched between the outer concave parts 13 and the outer convex parts 14 and sliding in the direction toward the center O is restricted, a tension is reliably applied to the film 4 by the inner concave part 11 and inner convex part 12. Therefore, at an intermediate point between the first concave flow path 5a and the second concave flow path 5b, the diaphragm part 4a, which is part of the film 4, can be stretched with a strong tension without the diaphragm part 4a being warped or wrinkled At the fitting part between the inner concave part 11 and the inner convex part 12, the clearance 52 between the outer wall surface 12b of the inner convex part 12 and the outer-side inner surface 11b of the inner concave part 11 is preferably narrow and the clearance 51 between the inner wall surface 12a and the inner-side inner surface 11a is preferably wide, as illustrated in FIG. 4. Therefore, when the inner convex part 12 and inner concave part 11 are fitted to each other, a force with which the film 4 is held by the outer wall surface 12b and outer-side inner surface 11b becomes larger than a force with which the film 4 is held by the inner wall surface 12a and inner-side inner surface 11a.

Therefore, when the inner convex part 12 enters the inner concave part 11, the film 4 is sandwiched between the outer wall surface 12b and the outer-side inner surface 11b, which form the second film restricting part, and is also sandwiched between a part from the top face of the inner convex part 12 to the inner wall surface 12a, which forms the second film tension setting part, and a part from the bottom face of the inner concave part 11 to the inner-side inner surface 11a in a state in which sliding in a direction toward the center O is restricted. Therefore, a strong tension is applied to the diaphragm part 4a without being warped or wrinkled.

Particularly, if the film 4 is made of a resin the surface of which has a slightly adhesion like a silicone thin film, the film 4 is pasted to the first plane 2a of the first plate 2 and is held. With both a holding force due to this adhesive force and the holding force by the outer wall surface 12b and outer-side inner surface 11b, the film 4 is firmly held and, when the inner convex part 12 enters the inner concave part 11, the film 4 is less likely to deviate toward the center O. Therefore, when the film 4 is sandwiched between the inner wall surface 12a and the inner-side inner surface 11a, it is possible to apply a strong tensile strength to the diaphragm part 4a.

The fluid control device 1 structured so that the film 4 is sandwiched between the first plate 2 and the second plate 3 as illustrated in FIGS. 1 and 3 is used as, for example, a micro pump. In this case, the communicating flow path 6a formed in the first plate 2 functions as an intake port of a fluid and the communicating flow path 6b functions as an exhaust port of the fluid. A positive pressure and a negative pressure are alternately applied from the communicating flow path 7 formed in the second plate 3 to the interior of the second concave flow path 5b, so a pressurizing force is repeatedly applied to the second concave flow path 5b by the diaphragm part 4a. Due to this operation, the fluid guided from the communicating flow path 6a to the first concave flow path 5a is exhausted from the communicating flow path 6b to the outside.

The fluid control device 1 can also be used as a micro valve. When a positive pressure is applied from the communicating flow path 7 formed in the second plate 3 to the interior of the second concave flow path 5b by a fluid, the communicating flow paths 6a and 6b are blocked by the diaphragm part 4a and the flow of the fluid in the communicating flow paths 6a and 6b is interrupted. When the interior of the second concave flow path 5b is depressurized, the flow of the fluid in the communicating flow path 6a and 6b is resumed.

If the fluid pressure in the second concave flow path 5b is kept constant, it is also possible to keep a constant pressure in the fluid flowing in the communicating flow paths 6a and 6b.

In the embodiment described above, the first film restricting part is formed by the outer convex part 14 and the first film tension setting part is formed by the inner convex part 12. In addition, the second film restricting part is formed by the outer wall surface 12b of the inner convex part 12 and the second film tension setting part is formed by the inner wall surface 12a, as illustrated in FIG. 4.

In the present invention, however, only the first film restricting part and first film tension setting part may be provided and the second film restricting part and second film tension setting part illustrated in FIG. 4 may not be provided. By contrast, only the second film restricting part and second film tension setting part illustrated in FIG. 4 may be provided and the first film restricting part and first film tension setting part may not be provided.

The shapes of the outer concave part 13 and outer convex part 14 may not be a partial arc in a plan view, as in FIG. 1. However, the outer concave part 13 and outer convex part 14 may be continuous in a ring shape in a plan view.

Figure 5:
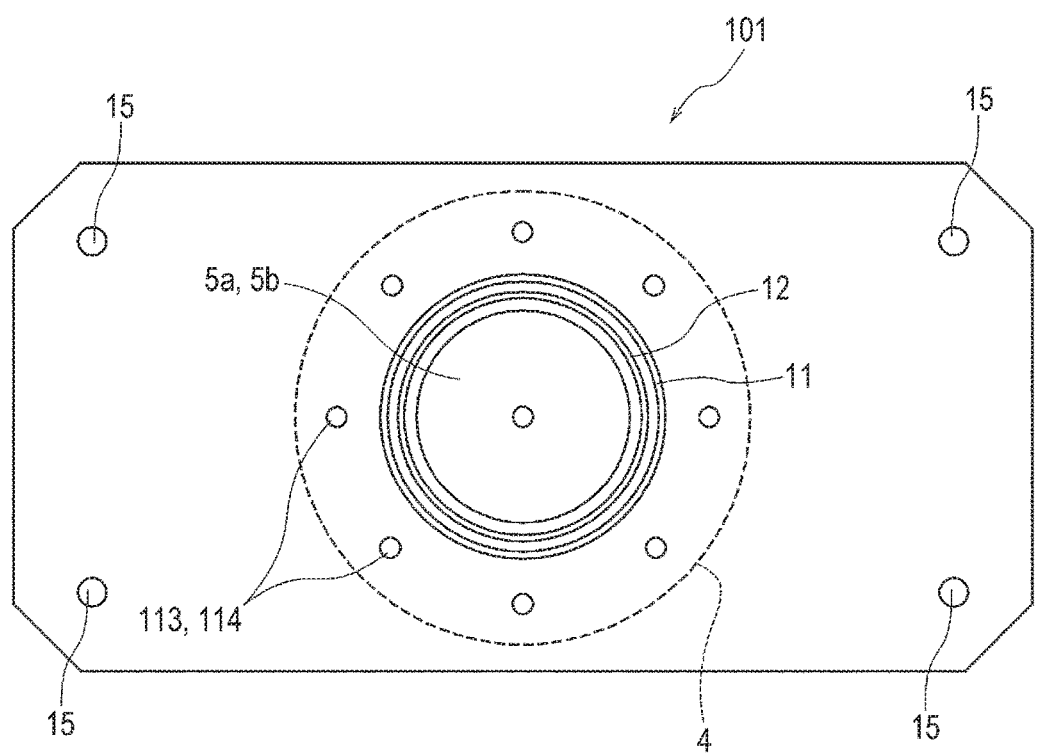
FIG. 5 is a plan view that illustrates a fluid control device in a second embodiment of the present invention.

Alternatively, as with a fluid control device 101 in a second embodiment illustrated in FIG. 5, outer concave parts 113 and outer convex parts 114 may have a circular cross-section and may be disposed at intervals of an equal angle around the center O.

What is claimed is:

1. A fluid control device comprising:
   a first plate having a first flow path;
   a second plate having a second flow path, the second plate facing the first plate such that the first and second flow paths face each other; and
   a film sandwiched between the first plate and second plate, the film including a diaphragm portion disposed between the first flow path and the second flow path, and a peripheral portion surrounding the diaphragm portion,
   wherein the first plate includes:
   a first plane surface configured to receive the film; and
   a groove portion recessed from the first plane surface and positioned in a region corresponding to the peripheral portion of the film,
   wherein the second plate includes:
   a second plane surface that abuts the film; and
   a protruding portion protruding from the second plane surface and disposed opposite to and engaging with the groove portion, part of the peripheral portion of the film being fitted in the groove portion such that the groove portion and the protruding portion engage with each other via the part of the peripheral portion sandwiched therebetween, thereby forming an engaging portion,
   wherein the protruding portion includes:
   an inner wall oriented toward a center of the diaphragm portion; and
   an outer wall opposite to the inner wall, a gap between the outer wall and an inner surface of the groove portion being narrower than a gap between the inner wall and the inner surface of the groove portion, and
   wherein the engaging portion includes:
   a film restricting part disposed at a position distant from the diaphragm portion and formed by the outer wall of the protruding portion and the inner surface of the groove portion; and
   a film tension setting part disposed at a position between the diaphragm portion and the film restricting part, the film tension setting part being formed by the inner wall of the protruding portion and the inner surface of the grove portion.

2. The fluid control device according to claim 1, wherein:
   the groove portion of the first plate includes an outer groove and an inner groove, the inner groove being closer to the diaphragm portion than the outer groove;
   the protruding portion of the second plate includes an outer protrusion opposing the outer groove and an inner protrusion opposing the inner groove, and an amount of protrusion of the outer protrusion from the second plane surface is larger than an amount of protrusion of the inner protrusion from the second plane surface; and
   the film restricting part is formed by the outer groove and the outer protrusion engaging with each other, and the film tension setting part is formed by the inner groove and the inner protrusion engaging with each other.

3. The fluid control device according to claim 1, wherein the film is made of a material adhesive to the first plane surface and the second plane surface.

4. The fluid control device according to claim 1, wherein the first plate further includes a joining surface surrounding the first plane surface, the joining surface directly abutting the second plane surface of the second plate, while the first plane surface abutting the second plane surface via the film disposed therebetween.

5. A fluid control device comprising:
   a first plate having a first flow path;
   a second plate having a second flow path, the second plate facing the first plate such that the first and second flow paths face each other; and
   a film sandwiched between the first plate and second plate, the film including a diaphragm portion disposed between the first flow path and the second flow path, and a peripheral portion surrounding the diaphragm portion,
   wherein the first plate includes:
   a first plane surface configured to receive the film; and
   a groove portion recessed from the first plane surface and positioned in a region corresponding to the peripheral portion of the film, the groove portion including an outer groove and an inner groove, the inner groove being closer to the diaphragm portion than the outer groove,
   wherein the second plate includes:
   a second plane surface that abuts the film; and
   a protruding portion protruding from the second plane surface and disposed opposite to and engaging with the groove portion, part of the peripheral portion of the film being fitted in the groove portion such that the groove portion and the protruding portion engage with each other via the part of the peripheral portion sandwiched therebetween, thereby forming an engaging portion, the protruding portion including:
   an outer protrusion opposing the outer groove; and
   an inner protrusion opposing the inner groove, an amount of protrusion of the outer protrusion from the second plane surface being larger than an amount of protrusion of the inner protrusion from the second plane surface, the inner protrusion having an inner wall oriented toward a center of the diaphragm portion and an outer wall opposite to the inner wall, a gap between the outer wall and an inner surface of the inner groove being narrower than a gap between the inner wall and the inner surface of the inner groove,
   wherein the engaging portion includes:
   a film restricting part disposed at a position distant from the diaphragm portion, and
   a film tension setting part disposed at a position between the diaphragm portion and the film restricting part,
   wherein the film restricting part includes:
   a first film restricting part formed by the outer protrusion and the outer groove engaging with each other; and
   a second film restricting part formed by the outer wall of the inner protrusion and the inner surface of the inner groove, and
   wherein the film tension setting part includes:
   a first film tension setting part formed by the inner protrusion and the inner groove engaging with each other; and
   a second film tension setting part formed by the inner wall of the inner protrusion and the inner surface of the inner groove.

* * * * *